(12) United States Patent
Rave et al.

(10) Patent No.: US 10,549,760 B2
(45) Date of Patent: Feb. 4, 2020

(54) SYSTEMS AND METHODS FOR HANDLING A VEHICLE ECU MALFUNCTION

(71) Applicant: Red Bend Ltd., Hod Hasharon (IL)

(72) Inventors: Micha Rave, Herzliya (IL); Tali Eilam Tzoreff, Herzliya (IL)

(73) Assignee: Red Bend Ltd., Hod-Hasharon (IL)

( * ) Notice: Subject to any disclaimer, the term of this patent is extended or adjusted under 35 U.S.C. 154(b) by 0 days.

(21) Appl. No.: 16/340,095

(22) PCT Filed: Oct. 6, 2016

(86) PCT No.: PCT/IL2016/051092
§ 371 (c)(1),
(2) Date: Apr. 5, 2019

(87) PCT Pub. No.: WO2018/065973
PCT Pub. Date: Apr. 12, 2018

(65) Prior Publication Data
US 2019/0337526 A1    Nov. 7, 2019

(51) Int. Cl.
*B60W 50/02* (2012.01)
*G07C 5/00* (2006.01)
*G06F 21/55* (2013.01)

(52) U.S. Cl.
CPC .... *B60W 50/0225* (2013.01); *B60W 50/0205* (2013.01); *G06F 21/554* (2013.01); *G07C 5/008* (2013.01)

(58) Field of Classification Search
CPC .......... B60W 50/0225; B60W 50/0205; G07C 5/008; G06F 21/554
See application file for complete search history.

(56) References Cited

U.S. PATENT DOCUMENTS

| 4,910,494 A | 3/1990 | Tamai |
| 8,412,428 B2 * | 4/2013 | Ellis ....................... F16D 48/06 700/253 |

(Continued)

FOREIGN PATENT DOCUMENTS

| WO | 2014061021 | 4/2014 |
| WO | 20140061021 | 4/2014 |
| WO | 2018065973 | 4/2018 |

OTHER PUBLICATIONS

International Preliminary Report on Patentability dated Apr. 18, 2019 From the International Bureau of WIPO Re. Application No. PCT/IL2016/051092. (6 Pages).

(Continued)

*Primary Examiner* — Russell Frejd
(74) *Attorney, Agent, or Firm* — Gordon & Rees LLP

(57) ABSTRACT

According to an aspect of some embodiments of the present invention there is provided a vehicle mechanism for handling vehicle electronic control unit (ECU) malfunction, comprising: a first set of vehicle backup ECUs for operating in a backup vehicle driving mode comprising read-only firmware and disconnected from an interface with communication networks outside the vehicle, the vehicle backup ECUs providing at least basic driving related features of the vehicle including transmission and engine controllers to provide control of the vehicle; and a controller that switches from a standard vehicle driving mode operating according to a second set of standard vehicle ECUs to backup vehicle driving mode in response to a trigger indicative of malfunction of at least one ECU of the first set of vehicle ECUs.

20 Claims, 6 Drawing Sheets

(56) References Cited

U.S. PATENT DOCUMENTS

| | | |
|---|---|---|
| 8,977,416 B2 | 3/2015 | Park |
| 2013/0154354 A1* | 6/2013 | Hayashi ................ H02J 9/00 307/9.1 |
| 2016/0176411 A1 | 6/2016 | Tran et al. |
| 2017/0045003 A1* | 2/2017 | Fan ................ F02D 19/0644 |

OTHER PUBLICATIONS

International Search Report and the Written Opinion dated Jan. 22, 2017 From the International Searching Authority Re. Application No. PCT/IL2016/051092. (10 Pages).

International Search Report for PCT/IL2016/051092 dated Jan. 22, 2017.

\* cited by examiner

SYSTEMS AND METHODS FOR HANDLING A VEHICLE ECU MALFUNCTION

CROSS-REFERENCE TO RELATED APPLICATION

This application claims priority to and is the national phase of International Application No. PCT/IL2016/051092, filed on Oct. 6, 2016, entitled "SYSTEMS AND METHODS FOR HANDLING A VEHICLE ECU MALFUNCTION", the entire disclosure of which is expressly incorporated by reference in its entirety.

BACKGROUND

The present invention, in some embodiments thereof, relates to network connected vehicle driving ECUs and, more specifically, but not exclusively, to systems and methods for handling network connected vehicles experiencing ECU malfunction.

Vehicles connected to external networks (e.g., the internet) are vulnerable to malicious activity by remote entities accessing ECUs of the vehicle using the network interface of the vehicle. Such malicious activity may cause failure of the vehicle, and may even pose a safety risk when the vehicle is unable to operate safety due to the security breach. Existing solutions do not provide sufficient protection against such malicious activity.

SUMMARY

According to an aspect of some embodiments of the present invention there is provided a vehicle mechanism for handling vehicle electronic control unit (ECU) malfunction, comprising: a first set of vehicle backup ECUs for operating in a backup vehicle driving mode comprising read-only firmware and disconnected from an interface with communication networks outside the vehicle, the vehicle backup ECUs providing at least basic driving related features of the vehicle including transmission and engine controllers to provide control of the vehicle; and a controller that switches from a standard vehicle driving mode operating according to a second set of standard vehicle ECUs to backup vehicle driving mode in response to a trigger indicative of malfunction of at least one ECU of the first set of vehicle ECUs.

Optionally, the vehicle mechanism further comprises a monitoring component that monitors for malfunction of the second set of standard vehicle ECUs to identify an indication of tampering of data stored in at least one memory used by at least one ECU of the second set of standard vehicle ECUs, the tampering performed by a computing device that is non-integrated with the vehicle using the interface, and wherein the monitoring component automatically provides the trigger indicative of malfunction of at least one ECU of the second set of standard vehicle ECUs to the controller.

Optionally, the second set of standard vehicle ECUs provide advanced driver assistance systems (ADAS) features, and wherein the controller switches when the monitoring component detects malfunction of at least one ECU of the second set providing ADAS features.

Optionally, the monitoring component is further configured to automatically detect the malfunction according to an indication of compromise of integrity of data stored in at least one memory associated with at least one ECU of the second set, the data changed by a computing device non-integrated with the vehicle using the interface.

Alternatively or additionally, the monitoring component is further configured to automatically detect the malfunction based on an indication of malicious activity in at least one ECU of the second set of standard vehicle ECUs, wherein the malicious activity performed the tampering of data.

Alternatively or additionally, the monitoring component is further configured to automatically detect the malfunction based on an indication of manual physical tampering of at least one ECU of the second set of standard vehicle ECUs.

Optionally, the monitoring component is further configured to automatically detect the malfunction based on detection of injection of code instructions in at least one ECU of the second set of standard vehicle ECUs.

Alternatively or additionally, the monitoring component is further configured to automatically detect the malfunction based on detection of foreign data transmitted within a network and/or bus of the vehicle.

Alternatively or additionally, the monitoring component is further configured to detect the malfunction according to identified failure of a failsafe mode of at least one at least one ECU of the second set of standard vehicle ECUs implemented using software.

Alternatively or additionally, the monitoring component is further configured to detect the malfunction according to identified failure of a limp mode implemented in hardware in at least one ECU of the second set of standard vehicle ECUs.

Optionally, the controller component and the monitoring component are implemented within an agent that includes at least one processor and a memory storing code instructions for execution by the at least one processor.

Optionally, the controller switches from standard vehicle driving mode to backup vehicle driving mode in response to the trigger of manually entered user input entered by a user of the vehicle using a physical user interface.

Optionally, the first set of vehicle backup ECUs are designed to have no communication to the interface that communicates with a computing device located externally from the vehicle.

Optionally, the controller is implemented in hardware without data stored on a memory that is accessible and adjustable by a computing device located externally to the vehicle accessing the memory using the interface.

Optionally, the second set of standard vehicle ECUs comprise an automated driving system for an autonomous vehicle that assumes at least some automated driving functions.

Optionally, the first set of vehicle backup ECUs includes a subset of ECUs of the second set of standard vehicle ECUs that are critical to essential driving functionality and are non-ADAS features. Optionally, each of the subset of ECUs is associated with at least one memory device storing code instructions for features of the standard vehicle driving mode, and associated with another at least one memory device storing code instructions for features of the backup vehicle driving mode, wherein during the switching each of the subset of ECUs switches execution of the code instructions from the at least one memory device storing code instructions for features of the standard driving mode to the another at least one memory device storing code instructions for features of the backup vehicle driving mode. Optionally, the controller is further configured to perform the switching by triggering a reboot of the subset of ECUs, wherein rebooting ECUs restart in a backup mode based on executing code instructions stored in respective second memory devices.

Optionally, the first set of vehicle backup ECUs includes an engine control module (ECM) and a transmission control module (TCM).

Optionally, the first set of vehicle backup ECUs are in communication with a controller area network (CAN bus) that is disconnected from the second set of standard vehicle ECUs.

Optionally, at least one of the ECUs of the vehicle are duplicated, wherein each of the duplicated ECU are respectively assigned to the first set of backup vehicle ECUs and the second set of standard vehicle ECUs, wherein at least one ECU assigned to the second set of standard vehicle ECUs is designated as active and in communication with at least one network of the vehicle providing intra-vehicle communication, wherein at least one ECU assigned to the first set of vehicle backup ECUs is disconnected from the at least one network of the vehicle; wherein the controller is further configured to perform the switching by disconnecting the at least one ECU assigned to the second set of standard vehicle ECUs from the at least one network of the vehicle and connect the at least one ECU assigned to the first set of vehicle backup ECUs to the at least one network of the vehicle or to another backup network of the vehicle.

Optionally, the controller is implemented as a hypervisor managing backup code and standard driving code stored and concurrently executed by different virtual machines, wherein the hypervisor manages the switching to a backup mode by executing the backup code without triggering reboot of ECUs.

According to an aspect of some embodiments of the present invention there is provided a method for handling vehicle electronic control unit (ECU) malfunction, comprising: receiving a trigger indicative of malfunction of at least one ECU of a first set of vehicle backup ECUs for operating in a backup vehicle driving mode comprising read-only firmware and disconnected from an interface with communication networks outside the vehicle, the first set of vehicle backup ECUs providing at least basic driving related features of the vehicle including transmission and engine controllers to provide control of the vehicle; and switching from a standard vehicle driving mode operating according to a second set of standard vehicle ECUs to backup vehicle driving mode in response to the trigger.

Optionally, the method further comprises transmitting an indication of the switching to an external server using the interface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
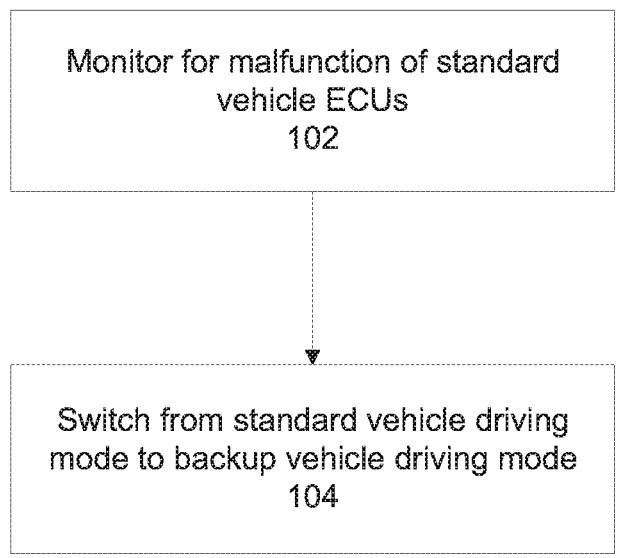
FIG. 1 is a method for handling vehicle ECU malfunction by switching to backup vehicle driving ECUs, in accordance with some embodiments of the present invention.

The present invention, in some embodiments thereof, relates to network connected vehicle driving ECUs and, more specifically, but not exclusively, to systems and methods for handling network connected vehicles experiencing ECU malfunction.

An aspect of some embodiments of the present invention relates to systems and/or methods (e.g., implemented in hardware and/or implemented using code instructions executed by one or more processors) that switch from standard vehicle driving ECUs that operate the vehicle in standard driving mode to backup vehicle driving ECUs that operate the vehicle in backup mode when one or more standard vehicle driving ECUs malfunction. Malfunction may be triggered based on identification of tampering of data (e.g., a breach in integrity of data) of the standard active vehicle driving ECUs, which may be caused by malicious activity and/or manual physical tampering. The standard vehicle driving ECUs includes a data interface (optionally a network interface) that provides data communication with computing device(s) that are non-integrated with the vehicle, for example, located externally to the network and/or ECUs of the vehicle, for example, remotely accessed by a server using a wireless network connection, and/or locally accessed by a mobile device connected to the vehicle network using a cable. Malicious activity may be conducted within the standard vehicle driving ECUs by the remotely located computing device using the data interface. The switching is performed to the backup vehicle driving ECUs which are disconnected from the standard vehicle driving ECUs and are disconnected from the interface providing connectivity with external networks. The backup vehicle driving ECUs provides at least basic driving related features of the vehicle that are uncompromised and unaffected by malicious activity. The basic driving related features include transmission and/or engine controllers that provide control of the vehicle in backup vehicle driving mode, for example, providing the driver and/or the automated vehicle with functionality continue driving with limited features enabling driving with no connectivity to external networks such as navigation, radio, (e.g., infotainment), for example, features enabling driving of an outdated car without advanced network based featured.

The indication of tampering of data may be detected based on monitored malfunction of the standard vehicle driving ECUs (e.g., performed by a monitoring ECU installed in the vehicle). Abnormal behavior of one or more of the standard vehicle ECUs is indicative of malfunction, and indicative of tampering of data and/or indicative of malfunction (e.g., due to malicious activity that tampered with the data causing the malfunction).

The switching from the standard vehicle driving ECUs to the backup vehicle driving ECUs is performed by an agent, optionally a controller component. The agent and/or controller may be implemented in hardware (e.g., to prevent compromise of data of the controller by malicious activity) and/or as code instructions executed by one or more processors (e.g., hypervisor).

Optionally, the backup vehicle driving ECUs are implemented as one or more electronic control units (ECU) that are disconnected from ECUs of the standard vehicle driving ECUs. The switching is performed by deactivating the ECUs of the standard vehicle driving ECUs and activating the ECUs of the backup vehicle driving ECUs.

Alternatively or additionally, the backup vehicle driving ECUs are based on backup code instructions executed by ECUs that are stored at a separate memory location than the standard code of the standard vehicle ECUs. The switching may trigger a reboot of the ECUs that loads the backup code instead of the standard code. The code of the backup vehicle driving ECUs may be stored in a read-only partition, optionally implemented using read-only firmware.

The systems and/or methods (e.g., implemented in hardware and/or implemented using code instructions executed by one or more processors) described herein relate to the technical problem of managing malfunction and/or tampering in integrity of data stored in standard vehicle driving ECUs connected to a data interface providing communication with external computing devices (e.g., network interface, antenna), for example, by malicious activity originating from a malicious entity external to the vehicle. The malfunction and/or tampering of the data may pose a safety risk, for example, the vehicle may not operate safety.

The systems and/or methods (e.g., implemented in hardware and/or implemented using code instructions executed by one or more processors) described herein improve an underlying technical process within the technical field of data security, in particular, within the technical field of securing data stored within a vehicle in communication with computing devices that are non-integrated with the vehicle over a data communication interface (e.g., network interface).

The systems and/or methods (e.g., implemented in hardware and/or implemented using code instructions executed by one or more processors) described herein may be directed towards management of malicious activity (e.g., malicious code attempting to install itself within the network, malicious code attempting to access and/or change data stored in the vehicle driving ECUs, and/or manual malicious activity performed by a human) within the vehicle driving ECUs. The switching from the standard vehicle driving ECUs (which is compromised by the malicious activity) to the backup vehicle driving ECUs provides sanitized vehicle driving ECUs that are unaffected by the malicious activity. Management of ECUs affected by malicious activity is a concept inextricably tied to computer technology and/or network technology.

The systems and/or methods (e.g., implemented in hardware and/or implemented using code instructions executed by one or more processors) described herein improve performance of the ECUs installed in the vehicle (e.g., improvement in processor and/or memory utilization) and/or the data communication network installed in the car (e.g., improvement in network performance, and/or available bandwidth). The improvement in performance is obtained by switching from ECUs and/or networks affected by malicious activity to ECUs that are sanitized (i.e., unaffected by the malicious activity). ECUs and/or networks adversely affected by malicious activity may experience degradation in processor performance, reduced available memory, degradation in network performance and/or available network bandwidth.

The systems and/or methods (e.g., implemented in hardware and/or implemented using code instructions executed by one or more processors) described herein improve performance of the vehicle itself, by providing sanitized backup vehicle driving ECUs (e.g., unaffected by malicious activity) when a compromise in integrity of data (e.g., due to malicious activity) is identified in standard vehicle driving ECUs. The vehicle with the sanitized vehicle driving ECUs (e.g., unaffected by malicious activity) is able to perform correctly, providing features as designed, for example, engine control features, and/or transmission control features. Vehicles adversely affected by malicious activity may malfunction, potentially resulting in vehicle failure, accidents, and navigation errors.

The systems and/or methods (e.g., implemented in hardware and/or implemented using code instructions executed by one or more processors) described herein are tied to physical real-life components, including physical computing devices (e.g., ECU, memory, vehicle components) that enable the vehicle to drive safely and perform correctly.

The systems and/or methods (e.g., implemented in hardware and/or implemented using code instructions executed by one or more processors) described herein provide a unique, particular, and advanced technique of managing vehicle driving ECUs having compromised data and/or ECUs that receive compromised input and/or compromised instructions (e.g., due to malicious activity).

Accordingly, the systems and/or methods described herein are inextricably tied to a network environment installed in a vehicle and/or to computer technology installed in a vehicle, to overcome an actual technical problem arising in vehicle driving ECUs and/or networks installed within vehicles.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term malicious activity may refer to automatic malicious activity performed by malicious code, and/or manual malicious actions performed by a human (e.g., hacker, thief, terrorist). Examples of malicious code include viruses, worms, Trojan horse, spyware, adware, cryptoware, and ransomware. Malicious code may be installed as executable code, a script, an application, a file, by injection, by manual coding, and/or other methods. Examples of manual malicious actions include manual physical tampering with existing data, physical destruction of one or more ECUs, exposing ECUs to extreme environments (e.g., temperature, pressure, humidity), installation of forged or fake data instead of real recorded sensor data, and installation of the malicious code.

As used herein, the terms malfunction, tampering, data integrity, compromise of data, data breach, malicious activity and malicious code are sometimes interchanged, for example, malfunction may be due to malicious activity (which may be caused by malicious code) which may be detected based on monitoring for modification of data integrity. In another example, malfunction may be due to modification of data integrity which may be assumed to be due to malicious activity (which may be caused by malicious code), since quality control checks are assumed to have been performed to verify the data integrity before release to users. It is noted that the systems and/or methods described herein are applicable for other cases where ECU malfunction is not necessarily due to compromise of data integrity, for example, where the automatic monitoring tool fails to detect the ECU malfunction, but the human user of the vehicle senses that something is wrong and is able to manually perform the switch. The systems and/or methods described herein provide a mechanism for handling sophisticated attacks that tamper with the monitoring tool, in which ECU malfunction is not automatically detected, by providing a way for the human user to activate the switch.

Figure 2:
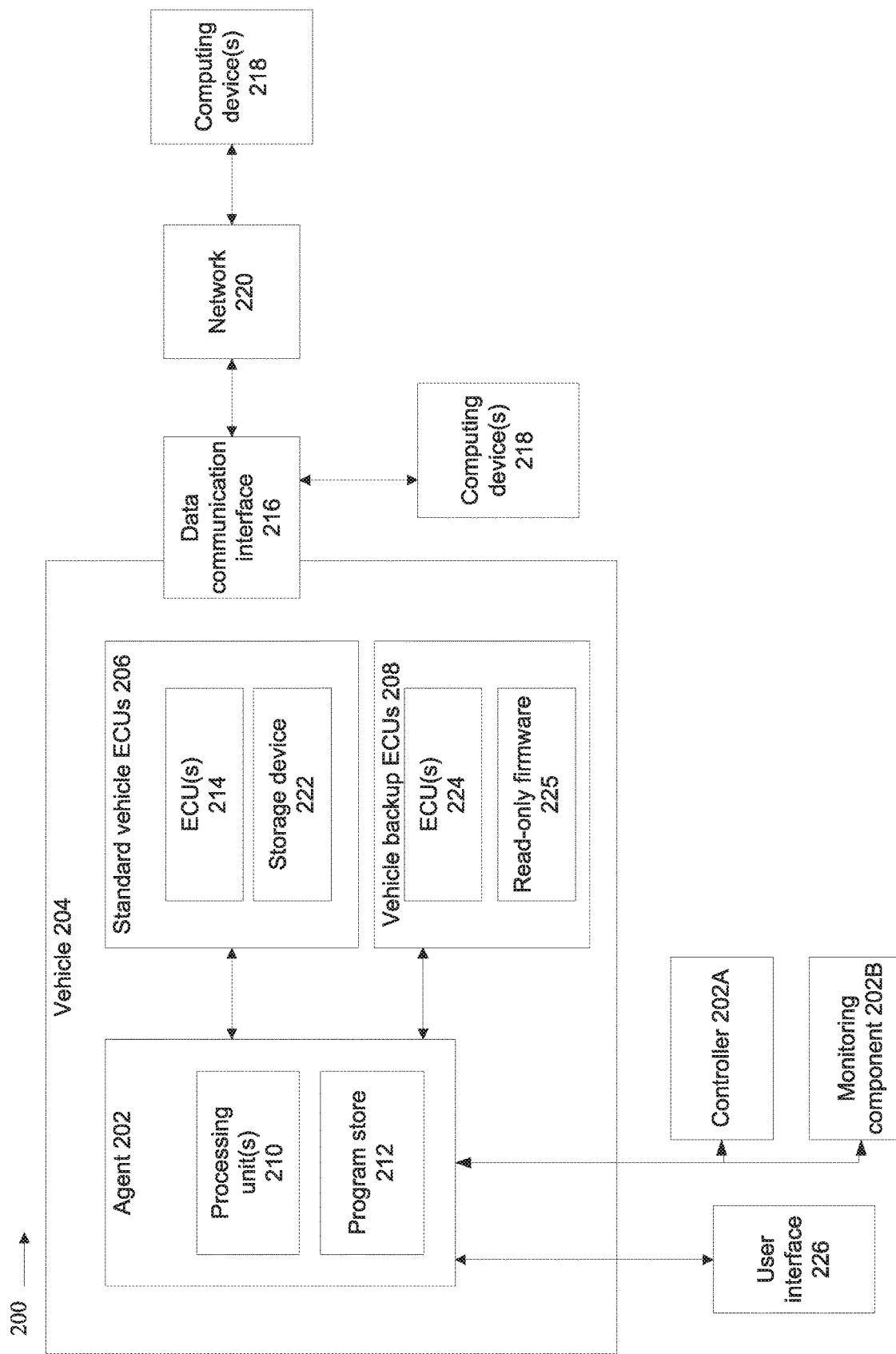
FIG. 2 is a block diagram of components of a system that includes an agent that switches from standard vehicle driving ECUs to backup vehicle driving ECUs in response to malfunction of one or more standard vehicle driving ECUs, in accordance with some embodiments of the present invention.

Reference is now made to FIG. 1, which is a method for handling a vehicle ECU malfunction (e.g., due to malicious activity) by switching to backup vehicle driving ECUs, in accordance with some embodiments of the present invention. The backup vehicle driving ECUs operate the vehicle in backup mode, rather than in standard mode, in response to malfunction by one or more standard vehicle driving ECUs. Reference is also made to FIG. 2, which is a block diagram of components of a system 200 that includes an agent 202 (installed in a vehicle 204) that switches from standard vehicle driving ECUs 206 (providing vehicle operation in standard driving mode) to backup vehicle driving ECUs 208 (providing vehicle operation in backup driving mode) in response to malfunction of one or more standard vehicle driving ECUs 206, in accordance with some embodiments of the present invention. The acts of the method described with reference to FIG. 1 may be executed by components of system 200 described with reference to FIG. 2, for example, by a processing unit(s) 210 of agent 202 executing code instructions (e.g., switching code) stored in a program store 212.

Agent 202 is installed within vehicle 204, optionally a road based vehicle, for example, a car, a truck, a van, a minivan, and a bus. Vehicle 204 may be an autonomously driven vehicle, a manually driven vehicle, or a semi-autonomous semi-manual driven vehicle.

As described herein agent 202 may include a controller component 202A and/or a monitoring component 202B. Controller component 202A and monitoring component 202B may be implemented as separate devices, for example, each including an independent processor(s) and independent memory devices. Controller component 202A and monitoring component 202B may be installed in separate locations within the vehicle. Alternatively, controller component 202A and monitoring component 202B may be implemented as integrated components, for example, as code instructions executed by a common processor(s) and/or as a single device installed in a certain location in the vehicle.

As used herein, acts performed by the controller may be understood as being performed by the agent. Acts performed by the agent may be understood as being performed by the controller and/or monitoring component.

Monitoring component 202B monitors for malfunction of standard vehicle ECUs of the vehicle that operate in a standard vehicle driving mode. The malfunction may be an indication of, for example, tampering of data stored in one or more memories used by the standard vehicle driving mode component(s), injection of malicious data, and physical destruction of the ECU.

Controller 202A performs the switching function that switches from standard vehicle driving mode to backup vehicle driving mode.

Agent 202 may be implemented using a combination of hardware and/or software, for example, processing unit(s) 210 are implemented in hardware, and switching code stored in program store 212 is implemented in software (for execution by processing unit(s) 210). The agent may be implemented in hardware without a data component that is accessible and changeable by an entity external to the vehicle, for example, implemented using read-only firmware. Alternatively, agent 202 may be implemented in hardware, for example, switching code stored in program store 212 and processing unit(s) 210 may be implemented as circuitry that cannot be modified by an external entity (e.g., resistant to data breaches by malicious activity). Alternatively or additionally, agent 202 may be implemented mechanically, for example, as a mechanical switch that is automatically and/or manually controlled.

Standard vehicle driving mode ECUs 214 provide operation of the vehicle in standard driving mode. Standard vehicle driving ECUs 206 includes one or more driving ECUs 214 that control driving related features of the car. Standard vehicle driving mode ECUs 214 may provide advanced driver assistance systems (ADAS) features of the vehicle, for example, adaptive cruise control, automatic parking, automatic navigation, blind spot monitor, collision avoidance system, driver drowsiness detection, backup driver assistant, intersection assistant, hill descent control, lane departure warning, parking sensor, pedestrian protection, and wrong-way driving warning.

Standard vehicle driving ECUs 206 may include ECUs 214 of an automated driving system for an autonomous car (or semi autonomous car) that assumes at least some automated driving functions.

Exemplary ECUs 214 include:

A transmission control unit (TCU) that controls the transmission of the vehicle according to data outputted by sensor(s).

Components that connect to one or more networks within the vehicle, and/or to network(s) that connect to externally located computing devices (e.g., using a wireless connection and/or wired connection) that are non-integrated with networks and/or ECUs and/or busses of the vehicle. Exemplary networks include: canvas, canfd, flexray, and Ethernet.

One or more ECUs that controls one or more of the electrical system and/or other subsystems in the vehicle.

One or more sensors that measure one or more parameters associated with the vehicles.

Standard vehicle driving ECUs are in communication with one or more data communication interfaces 216 that provide communication of data between ECUs 214 of standard vehicle driving ECUs 206 and one or more computing devices 218 (e.g., servers, client terminals, other vehicles, mobile devices) located externally to vehicle 204 that are non-integrated with vehicle 204. Data communication interface 216 may be implemented as a network interface providing connectivity over a network 220 (e.g., the internet, a local area network, a wide area network, a wireless network, a cellular network, and a short range temporally wireless channel (e.g., BLUETOOTH®, WiFi™). Data communication interface 216 may include one or more antennas and/or transceivers providing wireless network communication, and physical and/or virtual network connections, for example, network interface card(s) and/or software network interfaces. Data communication interface 216 may include a physical connection, for example, a cable connection, and/or a port.

Standard vehicle driving ECUs 206 includes a memory 222 (or other storage device) that stores data that may be changed by malicious activity originating from a certain computing device 218 gaining access using data communication interface 216. For example, a hacker may manually modify data in memory 222 using the certain computing device 218 accessing standard vehicle driving ECUs 206 over network 220 using data communication interface 216. In another example, malicious code may install itself in memory 222 from the certain computing device 218 by gaining access using data communication interface 216.

Exemplary data stored in memory 222 that may be tampered with and/or changed includes: control code instructions for one or more driving computing ECUs 214, data collected by sensor(s) of vehicle 204 designed to be transmitted to a remote server, for example, insurance data that may include parameters describing the driving performance of the driver, for example, whether speed limits are obeyed or not (e.g., using speed sensors and sign sensors), whether the driver stops fully at stop signs (e.g., using brake sensors and sign sensors), whether the driver drives too closely to other cars (e.g. using proximity sensors), and whether the driver stops at crosswalks to let pedestrians cross (e.g., using pedestrian sensors and road sensors). For example, safety data that may be based on the safety status of the car, for example, pressure in tires (e.g., pressure sensor), whether seat belts are worn by passengers (e.g., seat belt sensor), and whether the car headlights are on at night (e.g., light sensor). Car payment data, for example, data of a transponder used to automatically bill the driver for tolls, data of a gas payment system used to automatically bill the driver for gas, and data of a vehicle payment system used to track whether the driver is paying off the car according to scheduled car payments. Driver authentication data that may be used to detect who is driving the car, and whether they driver is authorized, for example, analyzing biometrics of the driver (e.g., face, voice, weight).

Backup vehicle driving ECUs 208 operate the vehicle in backup vehicle driving mode. Backup vehicle driving ECUs 208 includes one or more ECUs 224 that provide at least basic driving related features of the car, for example, ability to drive the car to the side of the road, basic safety feature (e.g., active air bag, headlights, hazard lights), and basic vehicle functions (e.g., brakes, gas pedal control). Backup vehicle driving ECUs 208 include read-only firmware 225 (e.g., stored in a read-only memory device). Read-only firmware 225 provides protection from malicious activity by the property that the data stored thereon is unchangeable and/or cannot be deleted. Backup vehicle driving ECUs 208 may include non-ADAS ECUs and/or features. ECUs 224 of backup vehicle driving ECUs 208 may include an engine control module (ECM) and/or a transmission control module (TCM).

Optionally, when one or more ECUs 224 and/or connected components (e.g., airbag, in-vehicle infotainment (IVI) device) are replaced with an unauthorized component and/or unauthorized ECU and/or a different third party component and/or third party ECU, the respective ECU 224 itself or associated with the replaced component may be automatically removed from the set of backup vehicle driving ECUs 208.

Backup vehicle driving ECUs 208 are disconnected from data communication interface 216. The integrity of data stored in backup vehicle driving ECUs 208 remains uncompromised and/or sanitized since external computing devices 218 are unable to change data stored in backup vehicle driving ECUs 208 using data communication interface 216.

Optionally, backup vehicle driving ECUs 208 include read-only firmware, optionally without a writable memory device. Backup vehicle driving ECUs 208 may be designed without data communication interface 216 to prevent access to ECUs 224 of backup vehicle ECUs 208 externally from the vehicle, which prevents contamination and/or prevents malicious activity initiated and/or originated by external malicious entities (e.g., using computing device 218).

Backup vehicle driving ECUs 208 may be designed to be physically inaccessible and/or designed to be physically assessed with difficulty, for example, ECUs 224 of backup vehicle driving ECUs 208 may be located in hard to access locations within the chassis of vehicle 204. The physical location of backup vehicle driving ECUs 208 may help reduce or prevent access by malicious entities having physical access to vehicle 204, for example, at a repair garage, at a car dealer, and/or at a parking lot.

Processing unit(s) 210 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 210 may include one or more processors (homogenous or heterogeneous), which may be arranged for parallel processing, as clusters and/or as one or more multi core processing units, for example, distributed across multiple virtual and/or physical servers, for example, located within a computing cloud and/or at multiple network connected processing nodes.

Program store 212 stores code instructions implementable by processing unit(s) 210, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Alternatively or additionally, program store 212 is implemented in hardware or is omitted, with functionality performed by circuitry of processing unit(s) 210.

Alternatively or additionally, processing unit(s) 210 and/or program store 212 are omitted when agent 202 (optionally controller 202A) is implemented using mechanical components, for example, a mechanical switch that is manually and/or automatically activated to switch between standard vehicle driving ECUs 206 and backup vehicle driving ECUs 208.

Agent 202 (and/or vehicle 204) includes or is in communication with a physical user interface 226 (which may be integrated with a display, or be implemented as a separate device for example, as the user interface of the mobile device of the user), for example, a mechanical switch, a button to activate the switch, a touchscreen, a keyboard, a mouse, and voice activated software using speakers and microphone.

The systems and/or methods (e.g., implemented in hardware and/or implemented using code instructions executed by one or more processors) described herein may be used with existing cyber security solutions implemented in the vehicle (or used alone) by providing an additional layer of protection, irrespective of the efficacy of the implemented cyber security solution. The systems and/or methods (e.g., implemented in hardware and/or implemented using code instructions executed by one or more processors) described herein provide a backup vehicle system when security of the vehicle is breached, for example, the front-line cyber security solution failed to prevent malicious activity from occurring, for example, the vehicle malfunctioned due to the malicious activity. Conceptually, for example, the back-up provided by the systems and/or methods described herein may be considered in reference to an airbag that is deployed when accident safety vehicle of the features have failed in preventing an accident.

Referring now back to FIG. 1, at 102 malfunction of one or more ECU(s) 214 of standard vehicle ECUs 06 is identified. The malfunction may be detected by monitoring for tampering of data stored in memory 222 of standard vehicle driving ECUs 206. Alternatively or additionally, the indication is of a malfunction in the standard vehicle driving ECUs 206, without necessarily generating an indication of which ECU(s) 214 were affected by the malfunction. The malfunction in the standard vehicle driving ECUs may be assumed to be based on a tampering of data stored in memory 222, even when the actual affected memory is not known at the time of generation of the indication of the malfunction. The tampering of data may be performed by an external entity (e.g., the certain computing device 208) that is non-integrated with the vehicle accessing the data stored in memory 222 using data communication interface 216.

Monitoring component 202B monitors for malfunction of standard vehicle driving mode ECUs 206 that operate the vehicle in standard vehicle driving mode. The indication of the tampering of data may be based on detection of malfunction of one or more ECUs 214, for example, an analysis of the behavior of one or more ECUs 214 relative to standard behavior, according to a set-of-rules defining the standard behavior, manual user input indicating malfunction (e.g., the user entering data using a physical user interface) and/or other methods.

It is noted that indications of malfunction may be generated based on other reasons not necessarily related to malicious activity, for example, defects in the manufactured software, damage to vehicle. The probability of the other reasons may be assumed to be significantly lower than due to malicious activity, for example, due to quality control by the manufacturer.

The indication of the malfunction may be detected directly (e.g., by analysis code) based on detecting malicious access, changes, reading, and/or deletion of the data). The indication of the malfunction may be detected indirectly (e.g., based on analysis code and/or user manual intervention) based on abnormal and/or uncontrolled and/or dangerous automatic behavior of the vehicle (which are assumed to be due to malicious changes and/or deletions of data stored in memory 2220). The indication of malfunction may be generated manually (e.g., the user pressing a button) and/or automatically (e.g., by code instructions that identify the malfunction). The indication of the malfunction may be generated by code instructions (and/or hardware implementation) of agent 202, and/or both other code instructions and/or hardware implementations in communication with agent 202 (e.g., located in vehicle 204, in standard vehicle driving ECUs 206, and/or in ECUs 214).

Exemplary methods of monitoring standard vehicle driving ECUs 206 to detect malfunction for generating the indication of the tampering of data include:

Data integrity detection code that automatically monitors the integrity of the data stored in memory 222.

Malicious activity detection code that detects breaches in integrity of data transmitted out from the vehicle based on a comparison with sensor data collected from sensor(s) of the vehicle, for example, as described with reference to International Patent Application No. IL2016/051033, titled "SYSTEMS AND METHODS FOR DETECTION OF MALICIOUS ACTIVITY IN VEHICLE DATA COMMUNICATION NETWORKS" filed on Sep. 18, 2016.

An indication of the malfunction (e.g., malicious activity) in standard vehicle driving ECUs 206 by monitoring code that detects abnormal, uncontrolled, and/or dangerous behavior of the vehicle, for example, that the vehicle did not stop at a stop sign, abnormal deployment of an airbag, and headlights that do not turn on at night.

In response to manually entered user input, for example, the user may press a button on the dashboard when the user suspects a malfunction. The user may suspect the malfunction, for example, when the vehicle does not respond normally, when the vehicle behaves erratically and/or dangerously, and/or when abnormal message appear on the dashboard.

In response to failure of a failsafe mode of one or more ECU. The failsafe mode may be implemented in software (which may expose the ECU to data breaches by accessing the ECU externally from the vehicle using data communication interface 216). The failing ECU is designed to enter the failsafe mode. The integrity of the failsafe mode may be compromised by tampering of the code instructions defining the failsafe mode (e.g., by malicious activity originating externally to the vehicle). The failure of the failsafe mode may be identified, for example, by code instructions that monitor expected actions during failsafe mode.

It is noted that the backup mode described herein is different than a standard failsafe mode. Standard failsafe modes perform a designated function when failure is detected, for example, using pre-stored values when a value (e.g., sensor measured) is unavailable, operate within a predefine setting (when control data to operate out of the range is unavailable), or shut down a component when malfunction of the control is detected. Standard failsafe mode uses the existing ECUs to control the failsafe mode. In contrast, the backup mode described herein is based on a dedicated ECU(s), and/or dedicate memory for storing instructions for operating in backup mode. Backup mode disables advanced features (e.g., navigation, infotainment, advanced safety features) and enables basic driving features (e.g., engine control, transmission control) using the ECU and/or memory dedicated to operating in backup mode. Moreover, it is noted that failsafe mode relates to a single ECU, while the backup mode described herein relates to a system of multiple ECUs of the vehicle.

In response to failure of a limp mode, optionally implemented in hardware. The limp mode is designed to be triggered when failure of one or more ECUs and/or other components (e.g., network, sensor(s)) occurs. Failure to enter the limp mode (as originally designed) (e.g., detected by code instructions that monitor the triggering of the limp mode) may trigger the generation of the indication.

Automatic detection of code instructions injected into one or more standard vehicle driving mode ECUs. For example, malicious code is installed in a memory to collected data from the vehicle and transmit the data to a malicious server.

Automatic detection of foreign data transmitted within a network and/or bus (e.g., CAN bus) of the vehicle. For example, a transmitter that generates noise is installed in the vehicle to disrupt data communication within the network, and/or malicious code generates junk data to jam the bandwidth of the CAN bus.

Optionally, a message indicative of the generation of the indication of the malfunction (e.g., indicative of malicious activity in standard vehicle driving ECUs 206) is generated and transmitted using data communication interface 216 to one or more computing devices that are non-integrated with vehicle 204 and/or are located externally to vehicle 204. The message may be transmitted upon generation of the indication, before the switching (to the backup vehicle driving ECUs), and/or after the switching. The message may be transmitted, for example, as a short message service (SMS), an email, a notification alert, a pop-up message that is pushed to the computing device and presented on the display of the device, and/or a recorded message provided as a call to a telephone. The message may include additional identification data of the affected vehicle, for example, the license plate number of the vehicle, a dump of the affected memory 222, and identification code of the affect ECU(s) and/or other component(s). Exemplary computer devices receiving the message include: mobile devices having addresses and/or phone numbers defied by the ECU and/or other components that were breached, the server of a fleet of which the vehicle is a member, the mobile device of the owner of a car, an backup services server, a server of the manufacturer of the ECU and/or other components affected by the tampering, server of the insurance company insuring the vehicle, and mobile devices of relatives of the driver currently driving the vehicle.

At 104, agent 202 switches active functions from standard vehicle driving ECUs 206 to backup vehicle driving ECUs 208 that are disconnected from data communication interface 206. Backup vehicle driving ECUs 208 include ECUs 224 designed to provide at least basic driving related features of the vehicle, for example, to provide the driver with the ability to safety continue driving the vehicle, for example, to a repair facility.

The switching is implemented according to the architecture of the standard vehicle driving ECUs 206 and/or backup vehicle driving ECUs 208 and/or agent 202.

Exemplary switching procedures based on exemplary architectures based on system 200 of FIG. 2 are now described with reference to FIGS. 3-6. The components of the exemplary architectures correspond to the components of system 200 of FIG. 2.

Figure 3:
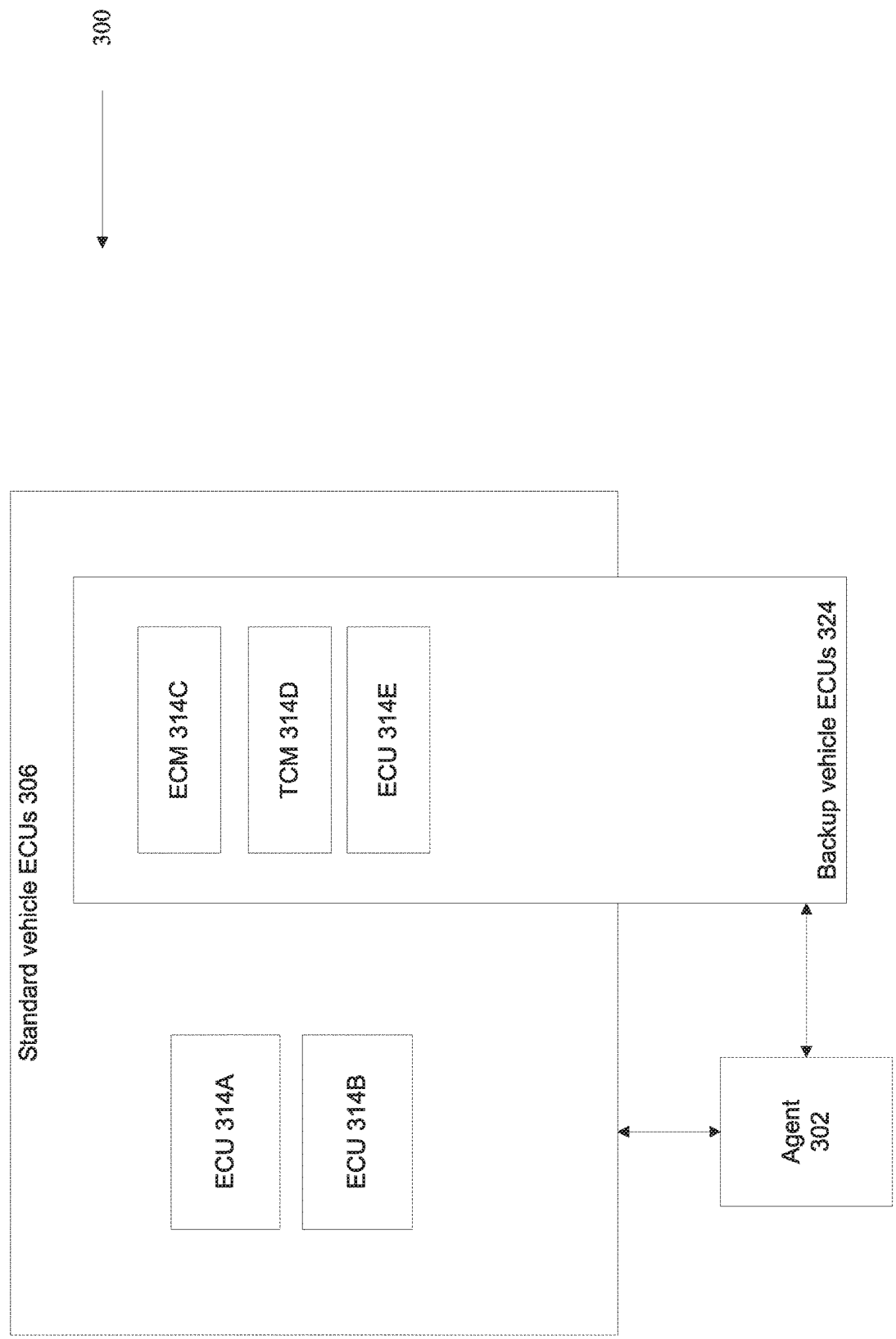
FIG. 3 is a schematic of an exemplary architecture of the system of FIG. 2, in accordance with some embodiments of the present invention.

Reference is now made to FIG. 3, which is a schematic of an exemplary architecture 300 of system 200 of FIG. 2, in accordance with some embodiments of the present invention. Backup vehicle driving ECUs 324 (corresponding to backup vehicle driving ECUs 224 of FIG. 2) includes a subset of ECUs of standard vehicle driving ECUs 306 (corresponding to standard vehicle driving ECUs 206 of FIG. 2). The subset may include critical ECUs providing essential driving functions, for example, ECM and/or TCM. Agent 302 (corresponding to agent 202 of FIG. 2) performs the switching by deactivating the remaining ECUs, leaving the subset of ECUs active. Using the subset of existing ECUs reduces additional costs and/or weight in comparison to duplication of ECUs.

For example, standard vehicle driving ECUs 306 include ECUs 314A-E, for example, ECU 314A, ECU 314B, ECM 314C, TCM 314D, and ECU 314E. It is noted that 5 ECUs are depicted for clarity and simplicity. Driving ECUs may include, for example over 100 ECUs. Backup vehicle driving ECUs 324 may include ECM 314C, TCM 314D, and ECU 314E of standard vehicle driving ECUs 306.

Figure 4:
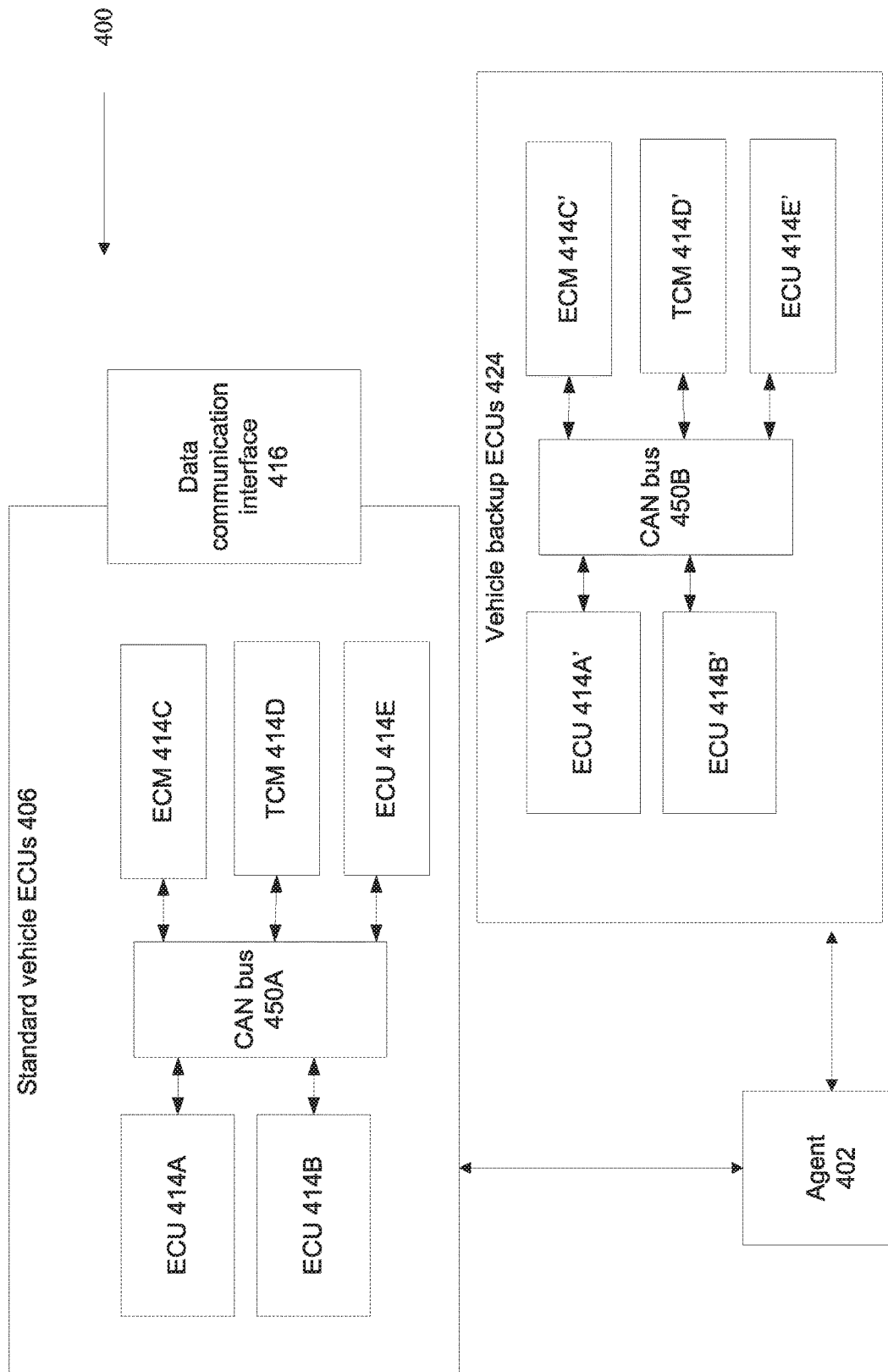
FIG. 4 is a schematic of another exemplary architecture of the system of FIG. 2, in accordance with some embodiments of the present invention.

Reference is now made to FIG. 4, which is a schematic of an exemplary architecture 400 of system 200 of FIG. 2, in accordance with some embodiments of the present invention. ECUs of backup vehicle driving ECUs 424 are designed to be isolated from ECUs of standard vehicle driving ECUs 406. The separate design and/or isolation provided by backup vehicle driving ECUs 424 provide high security against malicious activity.

Backup vehicle driving ECUs 424 includes ECUs ECU 414A', ECU 414B', ECM 414C', TCM 414D', and ECU 414E' that are duplicates of corresponding ECUs ECU 414A, ECU 414B, ECM 414C, TCM 414D, and ECU 414E of standard vehicle driving ECUs 406. ECUs ECU 414A', ECU 414B', ECM 414C', TCM 414D', ECU 414E' are in communication with an agent area network (CAN bus) 450B that is disconnected from standard vehicle driving ECUs 406. CAN bus 450B is disconnected from corresponding CAN bus 450A of standard vehicle driving ECUs 460, and disconnected from data communication interface 416.

Backup vehicle driving ECUs 424 may include ECUs ECU 414A', ECU 414B', ECM 414C', TCM 414D', ECU 414E' packaged together in a container that is disconnected from data communication interface 416 and/or disconnected from standard vehicle driving ECUs 206. Backup vehicle driving ECUs 424 may be designed without an external interface, and/or without a published ECU guide and/or wiring diagram. The container may be ruggedized and/or installed within the chassis of the vehicle selected to make physical access to the ECUs within the container difficult. Data and/or ECUs within backup vehicle driving ECUs 424 may be difficult or impossible to replace, reconfigure, and/or reprogram using a physical and/or wireless connection.

Figure 5:
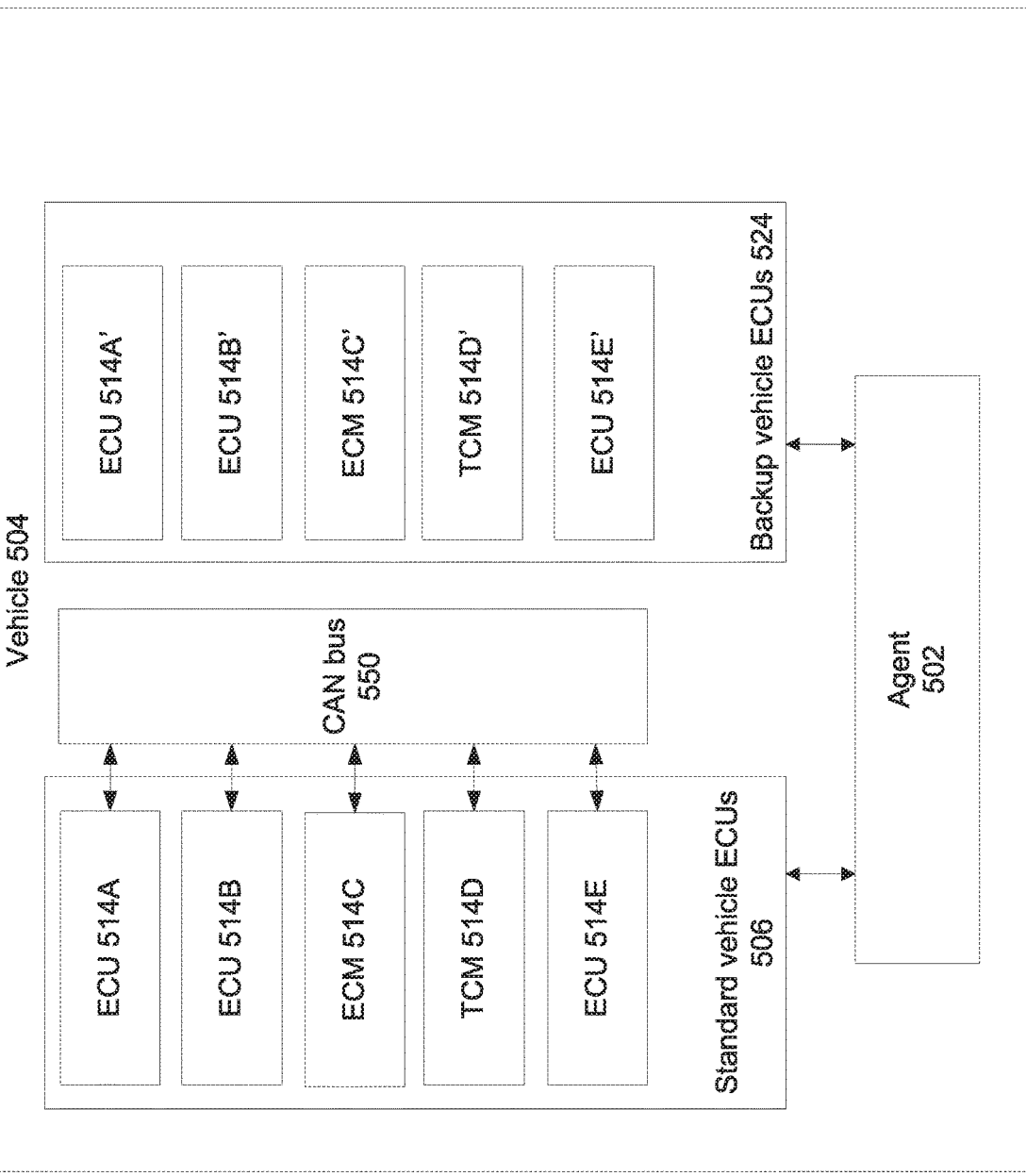
FIG. 5 is a schematic of yet another exemplary architecture of the system of FIG. 2, in accordance with some embodiments of the present invention.

Reference is now made to FIG. 5, which is a schematic of an exemplary architecture 500 of system 200 of FIG. 2, in accordance with some embodiments of the present invention.

One or more ECUs of standard vehicle driving ECUs 506 are duplicated and reside in backup vehicle driving ECUs 524. For example, ECU 514A is duplicated as ECU 514A', ECU 514B is duplicated as ECU 514B', ECM 514C is duplicated as ECM 514C', TCM 514D is duplicated as TCM 514D', and ECU 514E is duplicated as ECU 514E'. ECUs of standard vehicle driving ECUs 506 are designated as active and in communication with CAN bus 550 (and/or other network(s)) of vehicle 504. ECUs of backup vehicle driving ECUs 524 are disconnected from CAN bus 550.

Agent 502 performs the switching by disconnecting ECUs of standard vehicle driving ECUs 506 from CAN bus 550, and connects the corresponding duplicated ECUs of backup driving ECUs 524 to CAN bus 550.

The switching may be performed by a reboot of agent 502 and/or a reboot of standard vehicle driving ECUs 506.

ECUs of standard vehicle driving ECUs 506 may be packaged in one or more containers that are separate from one or more containers that store ECUs of backup vehicle driving ECUs 524.

Figure 6:
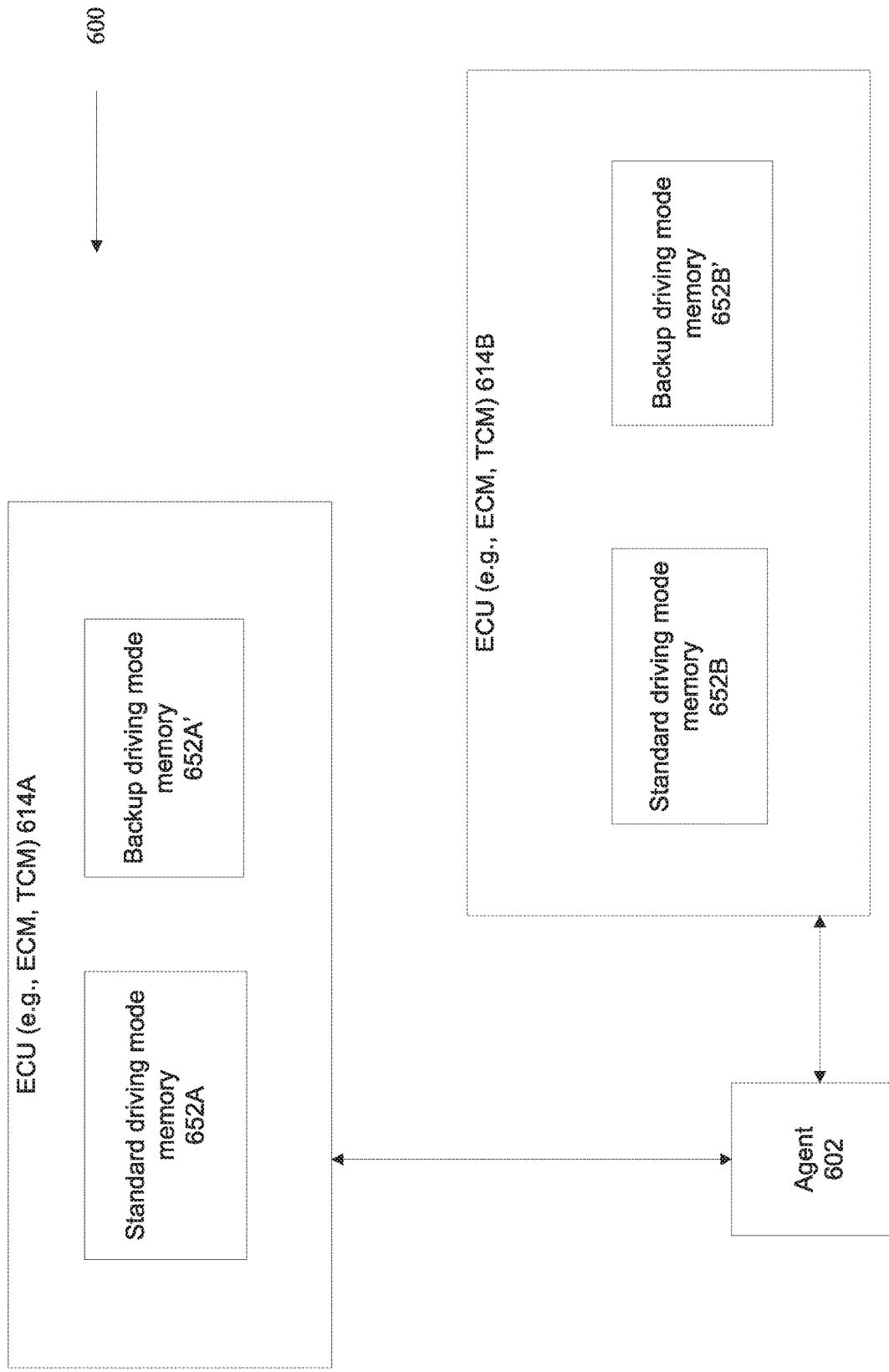
FIG. 6 is a schematic of yet another exemplary architecture of the system of FIG. 2, in accordance with some embodiments of the present invention.

Reference is now made to FIG. 6, which is a schematic of an exemplary architecture 600 of system 200 of FIG. 2, in accordance with some embodiments of the present invention.

ECUs 614A-B (two are shown for clarity and simplicity, but it is to be understood that a larger number of ECUs may be used) are designed to be used by the standard vehicle driving ECUs and switched to use by the backup vehicle driving ECUs. A single set of ECUs 614A-B is used. ECUs 614A-B include for example, ECU, ECM, and/or TCM.

Each ECU 614A-B includes a first memory device 652A-B storing code instructions for the standard vehicle driving ECUs, and a second corresponding memory device 652A'-B' storing code instructions for the backup vehicle driving ECUs. Memory devices 652A and 652A', and/or 652B and 652B' may be implemented as separate memory devices, and/or as separate partitions on the same memory device. Memory devices 652A'-B' store the code instructions in a read-only partition, optionally implemented as read-only firmware. The read-only code maintains integrity of the data by preventing malicious activity from modifying the data. Optionally, memory devices 652A and 652A', and/or 652B and 652B' are implemented using persistent storage (i.e., memory devices designed to retain code instructions during reboot and/or power off periods of time), for example, FLASH memory.

Agent 602 switches execution of code instructions (by the processor(s) of the respective ECU 614A-B) from 652A to 652A', and 652B to 652B'. Agent 602 performs the switching by triggering a reboot of the ECUs 614A-B. The reboot may be triggered by a command on the CAN bus and/or an electrical input pin on the connector(s) of the ECUs. The rebooting ECUs 614A-B restart in a backup mode based on executing code instructions stored in respective backup memory device 652A' and 652B'.

Optionally, agent 602 may be implemented as a hypervisor to manage the separation between the standard driving mode instructions stored in standard driving mode memories 652A-B and backup driving mode instructions stored in backup driving mode memories 652A'-B'. For example, standard driving mode instructions stored in memories 652A-B may be stored and/or executed by a virtual machine that is separate from another virtual machine that stores and/or executes backup driving mode instructions stored in memories 652A'-B'.

The hypervisor may be used to run the backup driving mode code (stored in memories 652A'-B') and standard driving mode code (stored in memories 652A-B) concurrently. The hypervisor switches to backup driving mode code when ECU malfunction is automatically detected (as described herein) and/or when the user manually triggers the switching (as described herein). The hypervisor may perform the switching without necessarily rebooting the ECUs.

With reference to FIG. 2, agent 602 of FIG. 6 may correspond to agent 202 implemented as a hypervisor managing backup code. The hypervisor may be executed by code instructions stored in program store 212 executed by processing unit 210. The backup code may be stored in program store 212, and/or in another memory device (e.g., as described with reference to FIG. 6). The hypervisor manages the switching to the backup mode by executing the backup code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant vehicle driving systems will be developed and the scope of the term vehicle driving system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A vehicle mechanism for handling vehicle electronic control unit (ECU) malfunction, comprising:
a first set of vehicle backup ECUs for operating in a backup vehicle driving mode comprising read-only firmware and disconnected from an interface with communication networks outside the vehicle, the vehicle backup ECUs providing at least basic driving related features of the vehicle including transmission and engine controllers to provide control of the vehicle; and
a controller that switches from a standard vehicle driving mode operating according to a second set of standard vehicle ECUs to a backup vehicle driving mode in response to a trigger indicative of malfunction of at least one ECU of the first set of vehicle ECUs.

2. The vehicle mechanism of claim 1, further comprising a monitoring component that monitors for malfunction of the second set of standard vehicle ECUs to identify an indication of tampering of data stored in at least one memory used by at least one ECU of the second set of standard vehicle ECUs, the tampering performed by a computing device that is non-integrated with the vehicle using the interface, and wherein the monitoring component automatically provides the trigger indicative of malfunction of at least one ECU of the second set of standard vehicle ECUs to the controller.

3. The vehicle mechanism of claim 2, wherein the second set of standard vehicle ECUs provide advanced driver assistance systems (ADAS) features, and wherein the controller switches when the monitoring component detects malfunction of at least one ECU of the second set providing ADAS features.

4. The vehicle mechanism of claim 2, wherein the monitoring component is further configured to automatically detect the malfunction according to an indication of compromise of integrity of data stored in at least one memory associated with at least one ECU of the second set, the data changed by a computing device non-integrated with the vehicle using the interface.

5. The vehicle mechanism of claim 2, wherein the monitoring component is further configured to automatically detect the malfunction based on a member of a group consisting of:
an indication of malicious activity in at least one ECU of the second set of standard vehicle ECUs, wherein the malicious activity performed the tampering of data,
an indication of manual physical tampering of at least one ECU of the second set of standard vehicle ECUs,
detection of injection of code instructions in at least one ECU of the second set of standard vehicle ECUs, and
detection of foreign data transmitted within a network and/or bus of the vehicle.

6. The vehicle mechanism of claim 2, wherein the monitoring component is further configured to detect the malfunction according to at least one of identified failure of a failsafe mode of at least one at least one ECU of the second set of standard vehicle ECUs implemented using software and identified failure of a limp mode implemented in hardware in at least one ECU of the second set of standard vehicle ECUs.

7. The vehicle mechanism of claim 2, wherein the controller component and the monitoring component are implemented within an agent that includes at least one processor and a memory storing code instructions for execution by the at least one processor.

8. The vehicle mechanism of claim 1, wherein the controller switches from standard vehicle driving mode to backup vehicle driving mode in response to the trigger of manually entered user input entered by a user of the vehicle using a physical user interface.

9. The vehicle mechanism of claim 1, wherein the first set of vehicle backup ECUs are designed to have no communication to the interface that communicates with a computing device located externally from the vehicle.

10. The vehicle mechanism of claim 1, wherein the controller is implemented in hardware without data stored on a memory that is accessible and adjustable by a computing device located externally to the vehicle accessing the memory using the interface.

11. The vehicle mechanism of claim 1, wherein the second set of standard vehicle ECUs comprise an automated driving system for an autonomous vehicle that assumes at least some automated driving functions.

12. The vehicle mechanism of claim 1, wherein the first set of vehicle backup ECUs includes a subset of ECUs of the second set of standard vehicle ECUs that are critical to essential driving functionality and are non-ADAS features.

13. The vehicle mechanism of claim 12, wherein each of the subset of ECUs is associated with at least one memory device storing code instructions for features of the standard vehicle driving mode, and associated with another at least one memory device storing code instructions for features of the backup vehicle driving mode, wherein during the switching each of the subset of ECUs switches execution of the code instructions from the at least one memory device storing code instructions for features of the standard driving mode to the another at least one memory device storing code instructions for features of the backup vehicle driving mode.

14. The vehicle mechanism of claim 13, wherein the controller is further configured to perform the switching by triggering a reboot of the subset of ECUs, wherein rebooting ECUs restart in a backup mode based on executing code instructions stored in respective second memory devices.

15. The vehicle driving system of claim 1, wherein the first set of vehicle backup ECUs includes an engine control module (ECM) and a transmission control module (TCM).

16. The vehicle mechanism of claim 1, wherein the first set of vehicle backup ECUs are in communication with a controller area network (CAN bus) that is disconnected from the second set of standard vehicle ECUs.

17. The vehicle mechanism of claim 1, wherein at least one of the ECUs of the vehicle are duplicated, wherein each of the duplicated ECUs are respectively assigned to the first set of backup vehicle ECUs and the second set of standard vehicle ECUs, wherein at least one ECU assigned to the second set of standard vehicle ECUs is designated as active and in communication with at least one network of the vehicle providing intra-vehicle communication, wherein at least one ECU assigned to the first set of vehicle backup ECUs is disconnected from the at least one network of the vehicle;
wherein the controller is further configured to perform the switching by disconnecting the at least one ECU assigned to the second set of standard vehicle ECUs from the at least one network of the vehicle and connect the at least one ECU assigned to the first set of vehicle backup ECUs to the at least one network of the vehicle or to another backup network of the vehicle.

18. The vehicle mechanism of claim 1, wherein the controller is implemented as a hypervisor managing backup code and standard driving code stored and concurrently executed by different virtual machines, wherein the hypervisor manages the switching to a backup mode by executing the backup code without triggering reboot of ECUs.

19. A method for handling vehicle electronic control unit (ECU) malfunction, comprising:
   receiving a trigger indicative of malfunction of at least one ECU of a first set of vehicle backup ECUs for operating in a backup vehicle driving mode comprising read-only firmware and disconnected from an interface with communication networks outside the vehicle, the first set of vehicle backup ECUs providing at least basic driving related features of the vehicle including transmission and engine controllers to provide control of the vehicle; and
   switching from a standard vehicle driving mode operating according to a second set of standard vehicle ECUs to a backup vehicle driving mode in response to the trigger.

20. The method of claim 19, further comprising transmitting an indication of the switching to an external server using the interface.

* * * * *